United States Patent [19]

Malinowski

[11] Patent Number: 5,287,037
[45] Date of Patent: Feb. 15, 1994

[54] METAL FERRULES FOR HERMETICALLY SEALING ELECTRIC LAMPS

[75] Inventor: Richard F. Malinowski, Chesterland, Ohio

[73] Assignee: General Electric Company, Schenectady, N.Y.

[21] Appl. No.: 802,024

[22] Filed: Dec. 3, 1991

[51] Int. Cl.$^5$ .............................................. H01J 17/18
[52] U.S. Cl. ..................... 313/623; 313/25; 313/113; 313/634
[58] Field of Search .................. 313/113, 25, 623, 634

[56] References Cited

U.S. PATENT DOCUMENTS

| | | | |
|---|---|---|---|
| 2,148,314 | 2/1939 | Wright | 176/34 |
| 2,597,681 | 5/1952 | Smith | 313/113 |
| 2,605,436 | 7/1952 | Stone et al. | 313/113 |
| 4,908,546 | 3/1990 | Shaffer et al. | 313/623 |
| 5,019,743 | 5/1991 | Olwert et al. | 313/25 |

Primary Examiner—Donald J. Yusko
Assistant Examiner—N. D. Patel
Attorney, Agent, or Firm—Edward M. Corcoran; George E. Hawranko; Stanley C. Corwin

[57] ABSTRACT

Electric lamps made using nickel-plated, high nickel content iron alloy ferrules wherein the ferrules have been heated above their surface oxidation temperature and then reduced during the lamp-making process have strong bonds between the ferrule and solder using non-corrosive soldering flux, even when using lead-free solder.

15 Claims, 2 Drawing Sheets

METAL FERRULES FOR HERMETICALLY SEALING ELECTRIC LAMPS

BACKGROUND OF THE INVENTION

1. Field of the Invention

This invention relates to metal ferrules used to form a hermetic seal with glass in the fabrication of electric lamps. More particularly this invention relates to a nickel-plated, high nickel content iron alloy ferrule which is used in the fabrication of electric lamps and which must form a hermetic seal with a glass lamp envelope and possess solderability, and lamps employing same.

2. Background of the Disclosure

For over fifty years the lamp industry has used metal ferrules in a variety of lamps to provide a means for supporting the light source within the lamp and for providing an electrically conductive means for supplying electricity to energize the lamp source from outside the lamp. These ferrules also function to hermetically seal the lamp by means of a hermetic seal to the glass envelope. The ferrules are generally cup- or thimble-shaped, open at one end and closed at the other, with the open end of the ferrule tapering to a feather or knife edge for forming a hermetic seal with the soft, hot glass into which the ferrule is pressed. In order for the ferrule to be able to make a hermetic seal with glass the ferrule must have a thermal coefficient of expansion similar enough to that of the glass. At the present time these ferrules are fabricated from a high nickel content iron alloy. A typical ferrule is made of an alloy consisting essentially of 42% nickel with the remainder iron. This alloy has thermal expansion and contraction characteristics which enable it to form a hermetic seal with glass. However, a problem associated with this high nickel content iron alloy is that repeatedly heating it up in an oxidizing atmosphere above 250°-300° C. (i.e., to a red heat) during the lamp manufacturing process impairs its solderability which results in weak solder joints between the ferrule and the exterior lamp electrical connecting means soldered to the ferrule subsequent to the thermal cycling. This results in defective lamps which cannot be sold. Accordingly, there has been a need for a lamp ferrule which does not exhibit weak solder bonds subsequent to the thermal cycling experienced during the lamp manufacturing process.

SUMMARY OF THE INVENTION

It has now been discovered that the use of metal lamp ferrules made of a nickel-plated, high nickel content iron alloy virtually eliminates lamp defects due to poor solder bonding strength between the ferrule and the external lamp electrical connecting means soldered to the exterior surface of the ferrule. Thus the present invention relates to a nickel-plated, high nickel content, iron alloy lamp ferrule which will form a hermetic seal with glass and whose exterior surface forms strong bonds with solder after being heated above its surface oxidation temperature of 250°-300° C. and reduced. In one embodiment the invention relates to electric lamps containing such ferrules. Employing the ferrules of the invention on lamps has resulted in an average solder torque strength of the lamp's exterior electrical connecting means to the ferrule 50% higher than with similar ferrules that are not nickel plated and that this strength remains at this high level even after exposure to extreme humidity and salt spray. It will be appreciated that the nickel-plated, high nickel content iron alloy of the invention can be used in other shapes and products for forming a seal with or bonding to glass, such as in the semiconductor and glass products industries. Hence, in another embodiment the invention relates to a solderable material for bonding to glass and also for forming a hermetic seal with glass which comprises a nickel-plated, high nickel content iron alloy. By high nickel content iron alloy is meant an iron alloy having a nickel content broadly ranging from 35-52 wt. % with the remainder being iron. Employing lamp ferrules of this invention has reduced soldering defects by 50%.

DETAILED DESCRIPTION

Figure 1A:
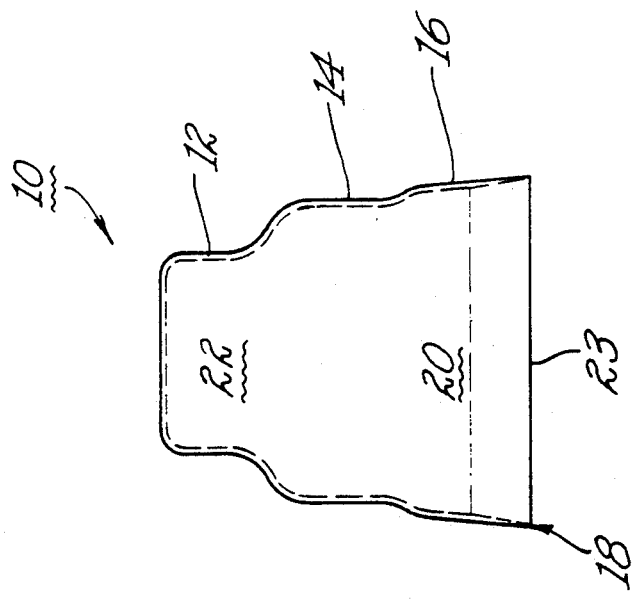
FIGS. 1(a) and 1(b) schematically illustrate a ferrule made of a nickel-plated, high nickel content iron alloy according to the invention.
Figure 1B:
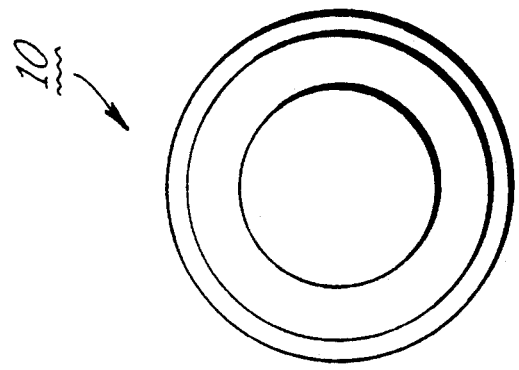

Turning to FIG. 1 there is schematically illustrated a side view and a top view of a typical lamp ferrule employed in lamp construction useful in accordance with the present invention. It should be noted that the overall size and shape of the ferrule depicted in FIG. 1 has been used for a number of years and is known to those skilled in the art. In FIG. 1 ferrule 10 is shown as being generally shaped like a cylindrical cup or thimble closed at its smaller end 12 (nib end) and open at its widest end 22 (skirt end) having a nominal overall height of about ½ inch and a nominal width at its open end 22 (which is its largest end) of about 7/16 inch. The ferrule is fabricated by pressing or drawing a disk of high nickel content iron alloy, nominally about 7½ mils thick, through a series of dies. As it can be seen from FIGS. 1(a) and 1(b), the ferrule has three steps of gradually increasing diameter with the cylindrical wall of the open end portion 16 being tapered to a feathered edge 18 having a thickness of about 4 mils approximately 10 mils up from the bottom 22. This thin feathered edge is required in order to achieve a hermetic seal with the glass into which it is pressed. The ferrules of the invention are nickel-plated, high nickel content iron alloy and are made from nickel-plated, high nickel content iron alloy sheet or strip metal. The alloy comprises nickel and iron with the nickel content broadly ranging between 35-52 wt. % and preferably 40-45 wt. %, with the remainder being iron. It has been found that at least 20 microinches of nickel plate should be present on the exterior nib portion 12 of the ferrule in order to achieve satisfactory solder bonds after the ferrule has been subjected to thermal cycling and surface oxide reduction prior to a soldering operation. Fifty microinches of nickel plate has been found to result in no weak solder bonds, irrespective of whether the solder is lead free or not.

Figure 2:
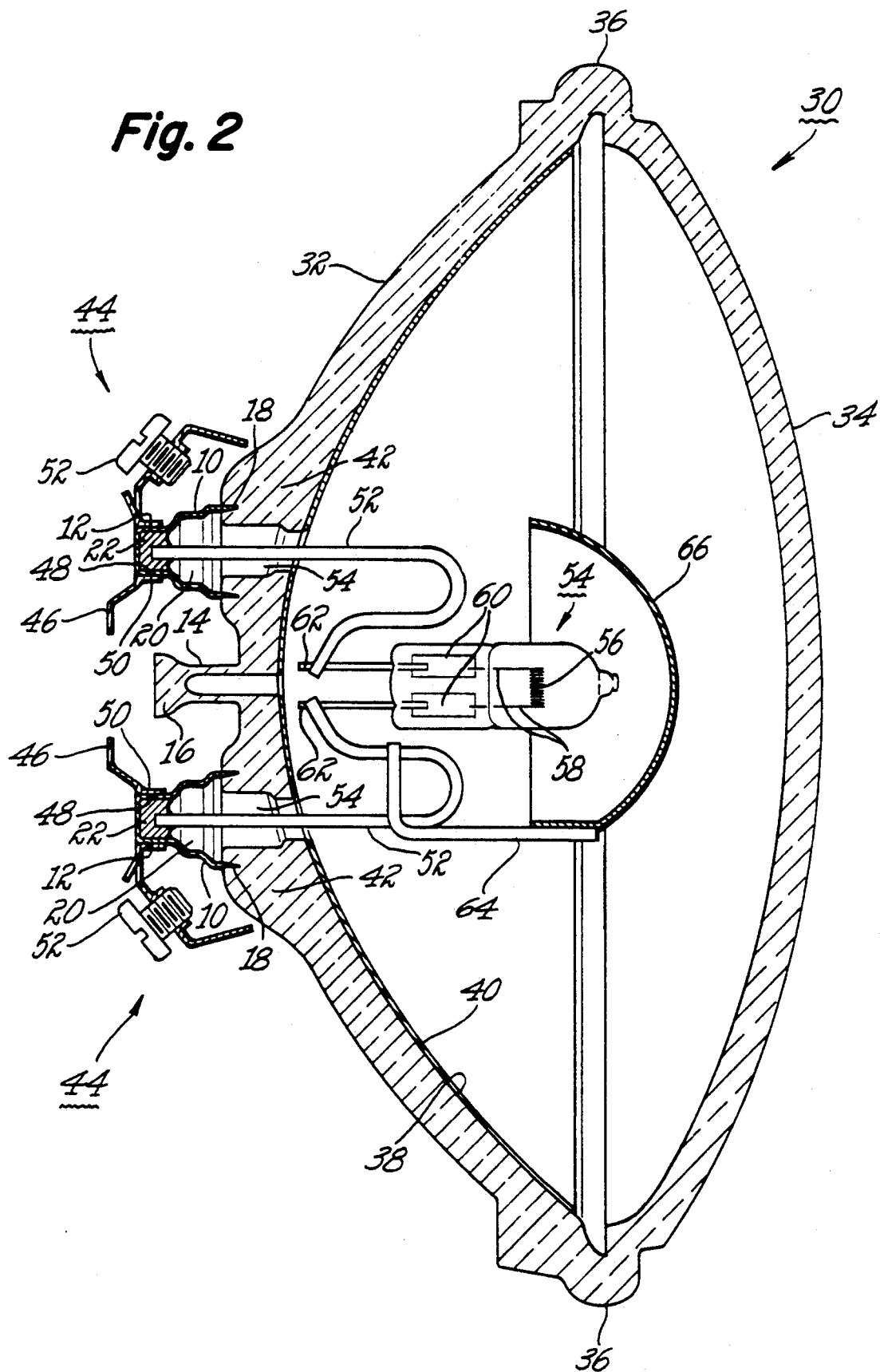
FIG. 2 schematically illustrates one embodiment of a lamp employing ferrules according to the invention.

FIG. 2 schematically illustrates one embodiment of a lamp 30 employing ferrules 10 of the invention, wherein the lamp construction is the type used in display lighting in department stores. Turning to FIG. 2, lamp 30 consists of a preformed pressed glass reflector section 32 and a preformed glass cover section or lens 34 fusion-sealed together at their peripheries, as indicated at 36. Lens or cover section 34 may be made of clear glass, or it may be stippled or otherwise rendered light-diffusing. Further, if desired, lens 34 may contain an optical interference coating for changing the color of the light emitted by the lamp or it may contain an ultraviolet or infrared absorbing or reflecting coating if the light source 54 contained within emits undesirable UV radiation. The inner reflecting surface 38 of reflector section 32 is provided with a light-reflecting coating 40 and is substantially parabolic in shape to project the light emitted by the light source in a forward direction. Light-reflecting coating 40 may be aluminum, other metal, an optical interference coating, etc., as is known to those skilled in the art. The rear outer portion of reflector section 32 terminates in a pair of raised glass portions or bosses 42 onto each of which is mounted a base structure 44. Each of base structures 44 is identical and each comprises an electrical terminal contact 46 in the form of a metal strap or lug, having a downwardly protruding cup-shaped cavity 48, the open cylindrical wall 50 of which fits over nib end 12 of ferrule 10. Electrical contact 46 is secured to the outer wall surface 12 of the nib portion of ferrule 10 by soldering. Screw terminal 52 is provided on contact 46 for connecting current supply wires thereto. Ferrules 10 are pressed into boss sections 42 of reflector section 32 while the glass is sufficiently hot to be deformed by and to wet and bond to the feathered edge bottom end 18 of the ferrule as will be described in greater detail below. Electrically conductive support rods 52 pass through holes 54 in glass reflector section 32 and are brazed into the interior cavity 22 of nib section 12 of ferrules 10. Support rods 52 support a light source 54 which can be a filament, a double-ended or a single-ended lamp, either incandescent or arc discharge (c.f., U.S. Pat. No. 5,019,743). As shown in the embodiment in FIG. 2, the light source is illustrated as a single-ended incandescent (i.e., a tungsten-halogen lamp) lamp having a high temperature glass or fused quartz vitreous envelope in which filament 56 is supported by inleads 58 which pass through molybdenum foil seals 60 and thence to outer leads 62 which are welded onto supports 52. Further, in the particular embodiment shown, reflector support rod 64 is also welded to light source support rod 52 and attached at its other end to an opaque, black, metal bowl-shaped light shield member 66 which is positioned over light source 54 to insure that all of the light projected forward of lamp 30 is light that has been reflected off light-reflecting surface 38. After assembly of the lamp has been completed, an inert gas such as argon is introduced into the lamp via exhaust tube 14 which is then pres sealed at 16.

During the lamp manufacturing process each of the two ferrules 10 are placed onto respective bossed area 42 of glass reflector section 32 while the glass is hot (about 700° C.). The ferrules are then heated to a cherry red color (about 1000° C.) and pushed into the respective bosses 42 to form a hermetic seal at the thin feathered edge portion 18 of the ferrule, after which the assembly is permitted to cool down to room temperature. In a subsequent part of the lamp manufacturing process, light source support wires or rods 52 are inserted into the interior cavity 22 of nib portion 12 of respective ferrules 10 and are brazed into said interior portion by means of a brazing compound. During this operation the nib portion 12 of the ferrules 10 is heated to a cherry red color again (about 1000° C.). These two heating steps result in an oxidized outer ferrule surface, particularly at the nib portion 12 of ferrule 10 to which the electrical contact strap 56 must subsequently be attached to by soldering.

The high nickel content iron alloy surface starts to oxidize at a temperature of about 250° C. and during the lamp-making process this temperature is greatly exceeded during the two operations just described. As a consequence, the outside surface of the ferrule, particularly at the nib portion 12, becomes oxidized. Consequently, the outer ferrule surface must be reduced back to metal in order to be able to solder the electrical base straps onto the ferrule in a subsequent soldering operation. The oxidized surface is reduced in hydrogen during the next step in the lamp manufacturing process. Thus, after the brazing step and while the ferrule is still at a temperature above the oxidation temperature of 250°-300° C., the reflector and ferrule assembly, with the light support rods 52 brazed in place, goes to another station where the hot ferrule is cooled under flowing hydrogen to reduce the surface oxide formed by the previous heating steps back to metal. This results in the exterior portion of the ferrule having a whitish appearance. Yet another heating cycle can occur if the lens is glass which is fusion-welded (as opposed to cemented) to the glass reflector which can heat the ferrule back up to about the oxidation temperature. This new oxidation is generally, but not always, removed by the solder flux when the metal electrical contact strap 46 is soldered to the nib portion of the ferrule 10. It is impossible to determine by visible inspection prior to the soldering operation whether or not a good solder bond will be achieved with a prior art ferrule subject to the thermal cycles described above using a non-corrosive flux, such as an activated organic resin flux. Consequently a significant number of defective or weak solder joints are produced resulting in defective lamps. These solder joints appear to break at the solder-ferrule interface. This situation is exacerbated when soldering with lead-free solder. With the ferrules of the invention, the average joint torque strength is 50% greater, the break is within the solder and the number of lamps lost due to soldering defects has been reduced by 50%.

While not wishing to be held to any particular theory, it has been demonstrated that this thermal cycling results in the surface of the high nickel content iron alloy being somewhat depleted of nickel, leaving a nickel deficient surface to which it is difficult to solder, even if the surface has been reduced in hydrogen. There is no difference in visual appearance in the reduced surface ferrules irrespective as to whether or not the nickel has been depleted from the surface after two high temperature thermal cycles and the hydrogen reduction treatment. Consequently, on a production line one cannot tell whether or not the ferrule has been sufficiently depleted of nickel on the surface as to result in a poor solder joint. This is true using an essentially non-corrosive solder flux, such as an activated organic resin flux with either a lead-containing solder, such as a 60/40 or 95/5 lead/tin solder or a lead-free solder such as 5/95 antimony/tin, 100% tin or Aqua Clean solder (96 Sn/3.5Bi/0.2Cu-0.2Aq) available from Federated Fry Metals. As set forth above, the problem is exacerbated with environmentally preferred lead-free solder. This has resulted in a low production rate of such lamps and a defect rate of as much as 3% of the lamps so-produced. Fluxing with an extremely aggressive acid, such as HCl, will reduce the incidence of poor solder joints, but create corrosion problems which result in a larger number of defective lamps than would be produced from defective solder joints.

This depletion of nickel on the surface of the high nickel content iron alloy for the lamp ferrules and concomitant weak solder bond, slow production rate and unacceptably high number of defective lamps has been a problem in the lamp industry for fifty years. Nickel cladding an iron ferrule or a high nickel content iron alloy ferrule will result in a weak bond between the nickel and the iron and creates serious problems in achieving hermetic seals. Barrel plating the high nickel content iron alloy ferrules at a nominal nickel plating thickness of from 50 to greater than 200 micro inches has resulted in good solder torque values, but did not achieve good hermetic seals. The barrel plating plates nickel on both the interior and exterior surfaces of the ferrules and results in a heavy, porous nickel plate (i.e., $\geq 100$ microinch) on the feathered edge. This results in an inability to form hermetic seals.

It has recently and unexpectedly been found that if the high nickel content iron alloy strip from which the ferrules are stamped or drawn is nickel plated, one can achieve both good hermetic seals to glass and good solder bond strengths using a non-corrosive, organic type solder flux, even with nickel plating of only 20 or 30 microinches thick. Fifty microinch thick nickel plating on the outside surface has resulted in exceptionally good solder bond strength and little, if any, failures in hermetically sealing the so-plated ferrules to the glass. Excellent hermetic seals have been achieved to glass with ferrules made from nickel-plated, high nickel content iron alloy strips (42 wt. % Ni, remainder Fe) that were plated primarily on one side. In this particular embodiment the ferrules were made with the nickel plating primarily on the outside of the ferrule which is where the nickel is needed in order to obtain a good solder bond. Some nickel plate was present on the other side (i.e., <10 microinches with a nominal 50 microinch plating), but one avoids the presence of heavy, porous nickel plate on the feathered edge which must make the hermetic seal to the glass. Employing this new ferrule has resulted in reducing the amount of solder used with no failures due to weak solder bonds when making lamps according to the above-illustrated process using a non-corrosive solder flux, even with lead-free solders.

Although the above has been directed toward achieving a hermetic seal or bonding between a nickel-plated, high nickel content iron alloy lamp ferrule and a lamp glass envelope, it will be appreciated by those skilled in the art that the invention will lend itself to other uses. Thus, in a broad sense the invention is directed toward an article of manufacture useful for forming a hermetic seal with glass and which possesses good solderability to solder using a non-corrosive solder flux with both lead-containing and lead-free solders after being heated above the oxidation temperature of about 250°-300° C. in an oxidizing atmosphere, such as air at least once.

What is claimed is:

1. A ferrule useful for forming a hermetic seal with glass being made of a nickel-plated metal alloy comprising 35=52 wt. % nickel with the remainder being iron, said ferrule having an exterior surface and a feathered edge for forming said seal, wherein the nickel plate is at least 20 microinches thick on said exterior surface of said ferrule, and is less than 100 microinches thick on said feathered edge of said ferrule.

2. The ferrule of claim 1 wherein said nickel content ranges from 40-45 wt. %.

3. The ferrule of claim 2 wherein said nickel plate is at least 50 microinches thick on its outside surface.

4. The ferrule of claim 1 being nickel-plated primarily on its outer surface.

5. A lamp comprising a glass envelope enclosing a source of electric light within wherein at least one nickel-plated, high nickel content iron alloy ferrule having a feathered edge is hermetically sealed to a portion of said glass envelope, wherein said nickel plate is at least 20 microinches thick on at least a portion of the exterior surface of said ferrule, and wherein said nickel plate is present on said feathered edge in an amount less than 100 microinches thick.

6. The lamp of claim 5 wherein said nickel content of said alloy ranges from 35-52 wt %.

7. The lamp of claim 6 wherein said alloy consists essentially of 35-52 wt. % nickel with the remainder being iron.

8. The lamp of claim 5 wherein an electrical conductor is soldered to a portion of the outer surface of said ferrule.

9. The lamp of claim 8 wherein said solder is lead free.

10. The lamp of claim 9 wherein said outer surface of said ferrule is reduced.

11. The lamp of claim 10 wherein a support for a source of light is brazed to the inside of said ferrule.

12. A lamp comprising a glass reflector having an interior light reflecting surface with a source of electric light mounted within said reflector and with two, nickel-plated high nickel content iron alloy ferrules hermetically sealed to said glass reflector by means of a feathered edge on each of said ferrules and wherein said nickel plate on said ferrules is at least 20 microinches thick on the exterior surface of each of said ferrules but is less than 100 microinches thick on said feathered edge on each of said ferrules.

13. A lamp according to claim 12 wherein said ferrules are nickel-plated primarily on said exterior surface.

14. A lamp according to claim 13 wherein said nickel plate on said exterior surface of said ferrules is at least 50 microinches thick.

15. A lamp according to claim 14 having a lens sealed to said glass reflector.

* * * * *